April 26, 1932.  W. W. DAY  1,855,943

GRATE

Filed April 26, 1930   2 Sheets-Sheet 1

Inventor
William W. Day

Wilkinson & Mawhinney
Attorneys.

April 26, 1932.  W. W. DAY  1,855,943

GRATE

Filed April 26, 1930   2 Sheets-Sheet 2

Inventor
William W. Day

By
Wilkinson & Mawhinney
Attorneys.

Patented Apr. 26, 1932

1,855,943

UNITED STATES PATENT OFFICE

WILLIAM W. DAY, OF HAMMOND, LOUISIANA, ASSIGNOR OF ONE-HALF TO EDWARD R. NORMAN, OF HAMMOND, LOUISIANA

CRATE

Application filed April 26, 1930. Serial No. 447,641.

The present invention relates to improvements in crates, and more particularly refers to a ventilated crate for use in shipping berries and fruit.

An object of the invention is to provide an improved durable crate, which will hold the fruit and berries in a sanitary condition and against cutting and bruising.

Another object of the invention lies in providing an improved crate which will be light and strong, suitable for transportation at minimum cost, and effective to deliver the fruit or other produce in wholesome condition.

A further object of the invention is to provide an improved crate structure involving flexible partitions or dividers for easy insertion and removal in the crate structure.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of an improved crate constructed according to the present invention.

Figure 1:
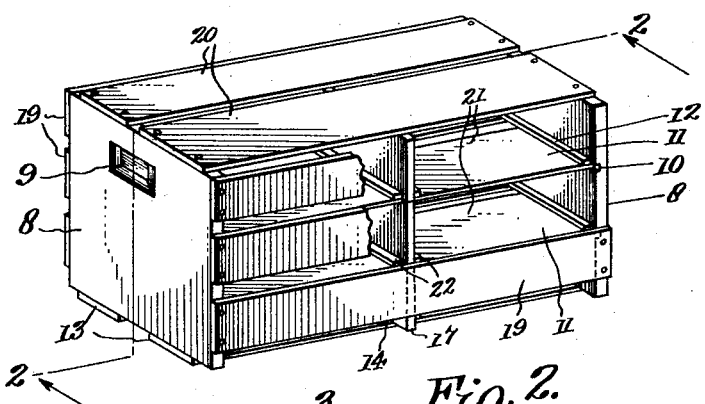

Referring more particularly to the drawings, 8 represents the ends of the crates in which hand holds or finger holds 9 are provided for ease in lifting and transporting the crate. The end walls are also provided with horizontally extending grooves 10 on their interior faces, spaced one above another in parallel relation, so as to receive the edges of the horizontal dividers or partitions 11. These dividers or partitions may be made up of slats or other material, out of which crates are usually made, and adjacent their ends are provided with slats or cleats 12 for engaging the inner surfaces of the end walls and just above the slots 10. These slats or cleats 12 reinforce the end portions of the horizontal dividers or partitions 11, and they act as stops to engage the end walls, while the ends of the partitions, which project beyond the cleat 12, enter the slots 10, and are seated on the bottom walls of such slots, whereby the partitions or dividers are supported.

The bottom 13 of the crate is also made up of one or more slats spaced apart for appropriate ventilation, and in the central portion of the bottom wall and on its inner sides are transversely spaced cleats 14 and 15 secured in any manner, as by nailing to the bottom 13. These parallel companion cleats or strips 14 and 15 provide therebetween a space or groove 16 adapted to receive the vertical divider or partition 17.

This vertical and transverse divider 17 is preferably only as high, or slightly higher, than the height of the berry boxes 18 contained within the crate, and the grooves 10 will be substantially in horizontal alignment with the upper edges of the dividers 17, the grooves 10 providing end supports for the horizontal partitions 11, and the vertical dividers 17 acting to sustain the horizontal partitions 11 at an intermediate point where they would be apt to sag.

The side walls of the crate are indicated at 19, and the top or cover of the crate at 20. The side walls and top are also preferably made, in accordance with the usual practice, of spaced slats adapted to give adequate ventilation to the interior of the crate.

Figure 5:
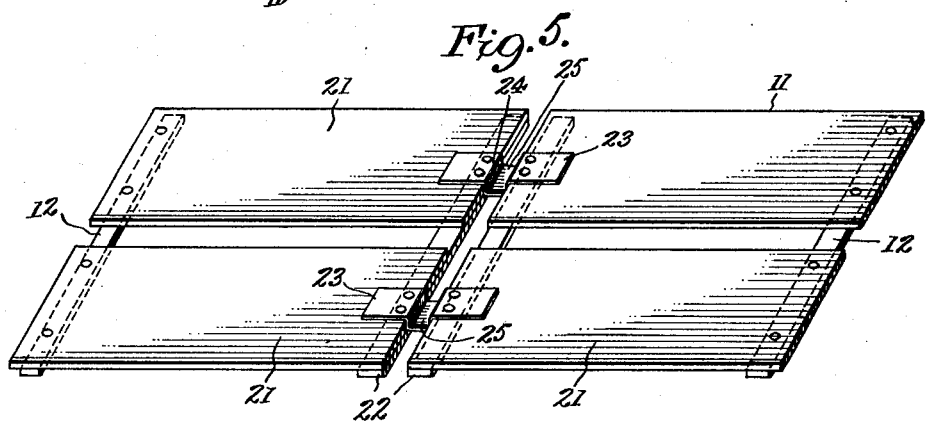
Figure 5 is a perspective view of one of the horizontal partitions.
Figure 6:
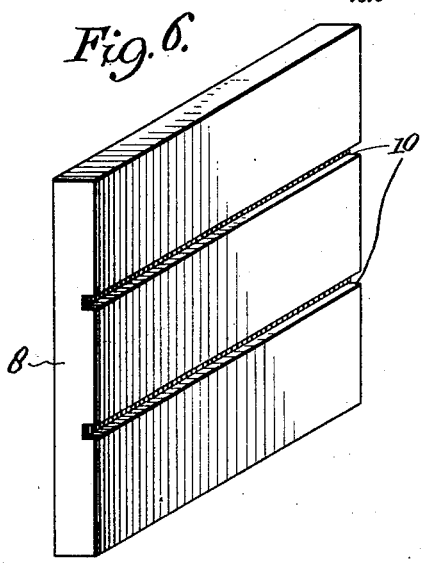
Figure 6 is a perspective view of one of the end walls of the crate.
Figure 7:
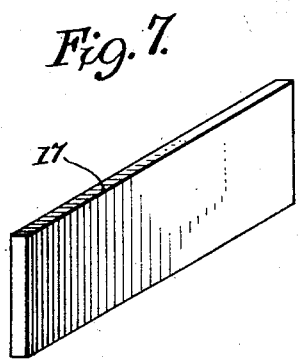
Figure 7 is a similar view of one of the vertical partitions.

The horizontal partitions 11 are more particularly shown in Figure 5, such partitions being preferably made up of the four boards 21 disposed in rectangular form, spaced apart as to their side edges and also as to the ends thereof. The boards 21 are nailed or otherwise secured to the cleats or strips 12, and in this way, the strips, which are continuous from side to side of the partitions, act to space and to retain in spaced relation, said boards 21. At their adjacent spaced ends, the boards are nailed or otherwise secured to strips or cleats 22 which extend transversely of the crate and are spaced apart, whereby to receive therebetween the upper transverse dividers 17, as indicated in Figure 2.

The ends 8 of the crate may be solid as shown, or composed of strips.

The lower edges of these dividers 17 are received between the cleats 22 and they rest upon the metal straps which are employed to secure the two sections of the horizontal partition together. These metal straps include the leaves 23, which are riveted or otherwise secured to the adjacent edges of the boards 21, and preferably also to the strips or cleats 22, whereby to give a firm hold to the fastenings. The intermediate portions of the metal pieces, from which the leaves 23 are fashioned, are bent into flanges 24 and yoke pieces or stirrups 25. The flanges 24 lie along the edges of the boards 21 and strips or cleats 22, and serve to reinforce and strengthen these parts, and to be in turn reinforced and strengthened thereby. The flanges 24 also form troughs, or off sets for the yoke pieces 25, and such flanges 24 act to embrace the upper ends of the vertical dividers 17, so as to hold such dividers in upright position. The upper edges of the dividers are received against the yoke pieces 25.

Figure 2:
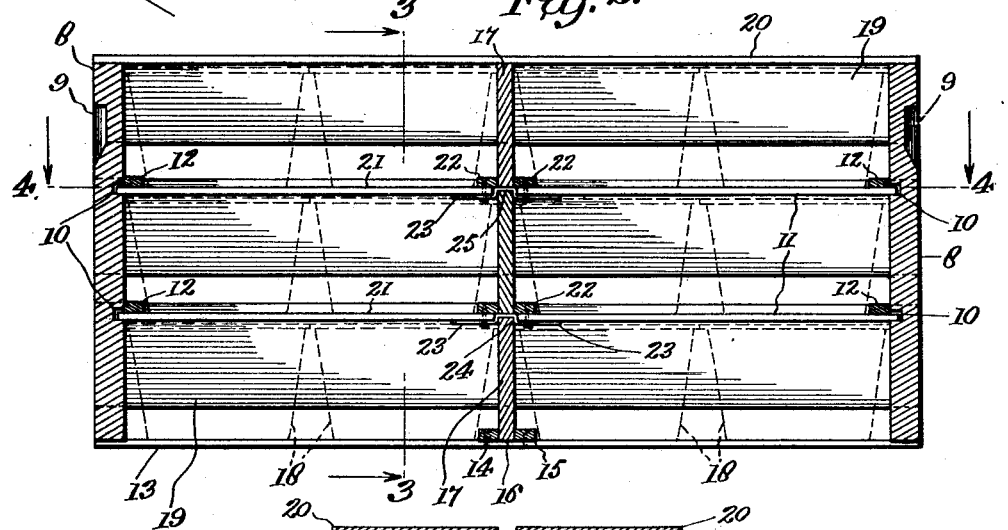
Figure 2 is a longitudinal section view taken on the line 2—2 in Figure 1.
Figure 3:
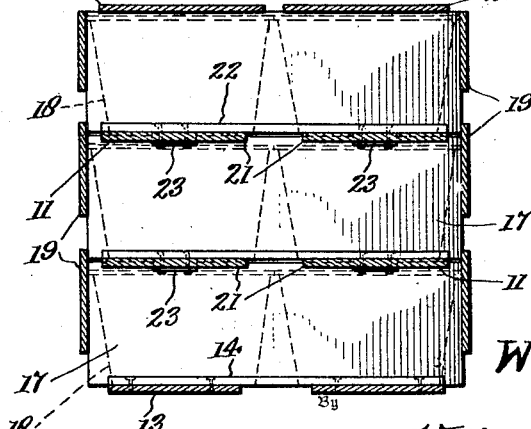
Figure 3 is a cross section taken on the line 3—3 in Figure 2.
Figure 4:
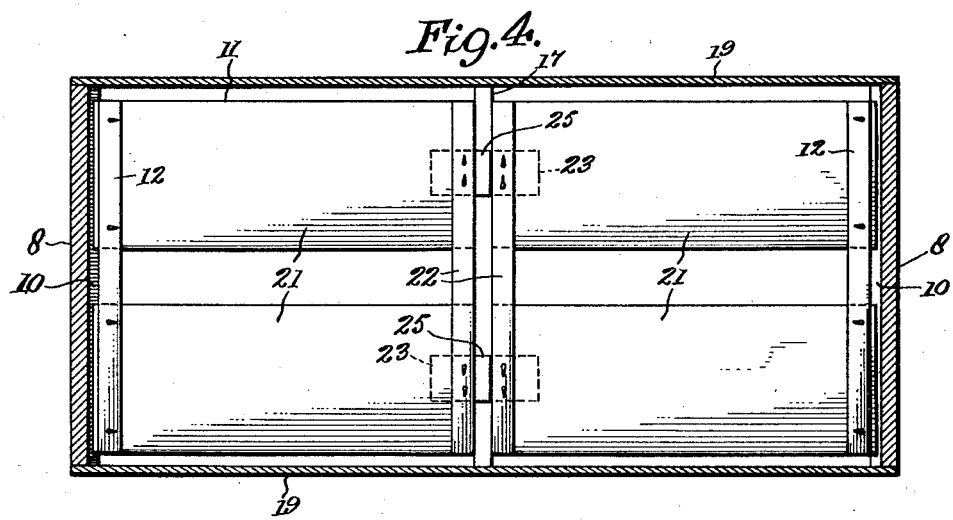
Figure 4 is a horizontal section taken on the line 4—4 in Figure 2.

In the use of the crate, strawberries are packed and placed in the boxes 18 in the usual way, and these boxes are placed in the improved crate in the manner indicated in Figure 2. In loading the crate, the horizontal partitions 11 and the vertical dividers 17 will, of course, be in knocked down condition, not yet assembled in the crate. The lower layer of boxes 18 is placed upon the bottom 13 of the crate, thereafter the lowermost vertical divider 17 is inserted between the cleats 14, 15, and the lowermost horizontal partition 11 is introduced by inserting the ends of the boards, which project beyond one of the cleats 12 into a slot 10, and thereafter springing the opposite ends of the partition in the slot 10 of the opposing end wall 8.

The inherent flexibility of the wood and the inherent flexibility of the metal pieces 25 will permit of a sufficient flexing of the horizontal partition to enable same to be sprung into place. When assuming the final position, the yoke piece 25 will rest upon the upper ends of the vertical dividers 17, thus holding the latter erect.

Thereupon, other boxes of berries are loaded upon the first horizontal partition, a second divider 17 placed between the strips 22 of the first partition, and then a second horizontal partition is inserted above the second layer of boxes in a manner already described. A third layer of boxes may be placed upon this second partition, and so on to any desired dimensions of the crate; after which the top 20 is laid or otherwise put in place.

With the improved crate, the fruit cannot be cut or bruised, and it will always remain in good condition; moreover, the fruit has considerably more ventilation than heretofore, and can be carried further in shipping. The empty crate will weigh from two to three pounds less than the present crate, thereby reducing tonnage. The dividers and partitions will protect the berries and fruit from being mashed and cut, and will prevent bleeding of the berries. When the crate is packed with fruit, the crate can be turned up side down without injury to the fruit, as the fruit will rest upon the divider, and will not shift or move in the crate. The improved crate will not require any change of machinery in the present box factories, and it will require less material than the present crate.

For inspection, the top and sides of the crate can be removed, without bruising the fruit, and it will be very easy for the inspector to handle the fruit.

By removing the small boxes 18, the crate may be used for shipping peaches, tomatoes and other vegetables and fruit, the same being loaded directly between the horizontal and vertical partitions.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. An improved shipping crate comprising a crate body, having grooves therein, partitions having end portions adapted to removably fit in said grooves and being formed in sections, the adjacent edges of the sections being separated, and flexible stiff metallic members secured to the sections and bridging the gap between such sections.

2. An improved shipping crate comprising a crate body, having grooves therein, partitions having end portions adapted to removably fit in said grooves and being formed in sections, the adjacent edges of the sections being separated, and flexible stiff metallic members secured to the sections and bridging the gap between such sections, and reinforcing cleats extending crosswise of the sections adjacent the ends thereof.

3. An improved shipping crate comprising a crate body having grooved ends, horizontal partitions having remote ends fitting removably in the grooves of the crate body and being composed of sections, the adjacent ends of which are spaced apart, transverse cleats extending across said partition sections at their remote and adjacent ends and metal pieces for securing said sections together and composed of leaves secured to opposite sections with flanges extending against the cleats and yokes extending between said flanges, said flanges and yokes forming troughs, and vertical dividers seated at their lower ends between said adjacent cleats and at their upper ends received within the flanges of the metal pieces.

WILLIAM W. DAY.